Feb. 4, 1936. K. O. WAECHTLER ET AL 2,030,037
YIELDABLE SAFETY LOCK
Filed Jan. 11, 1934 2 Sheets-Sheet 1
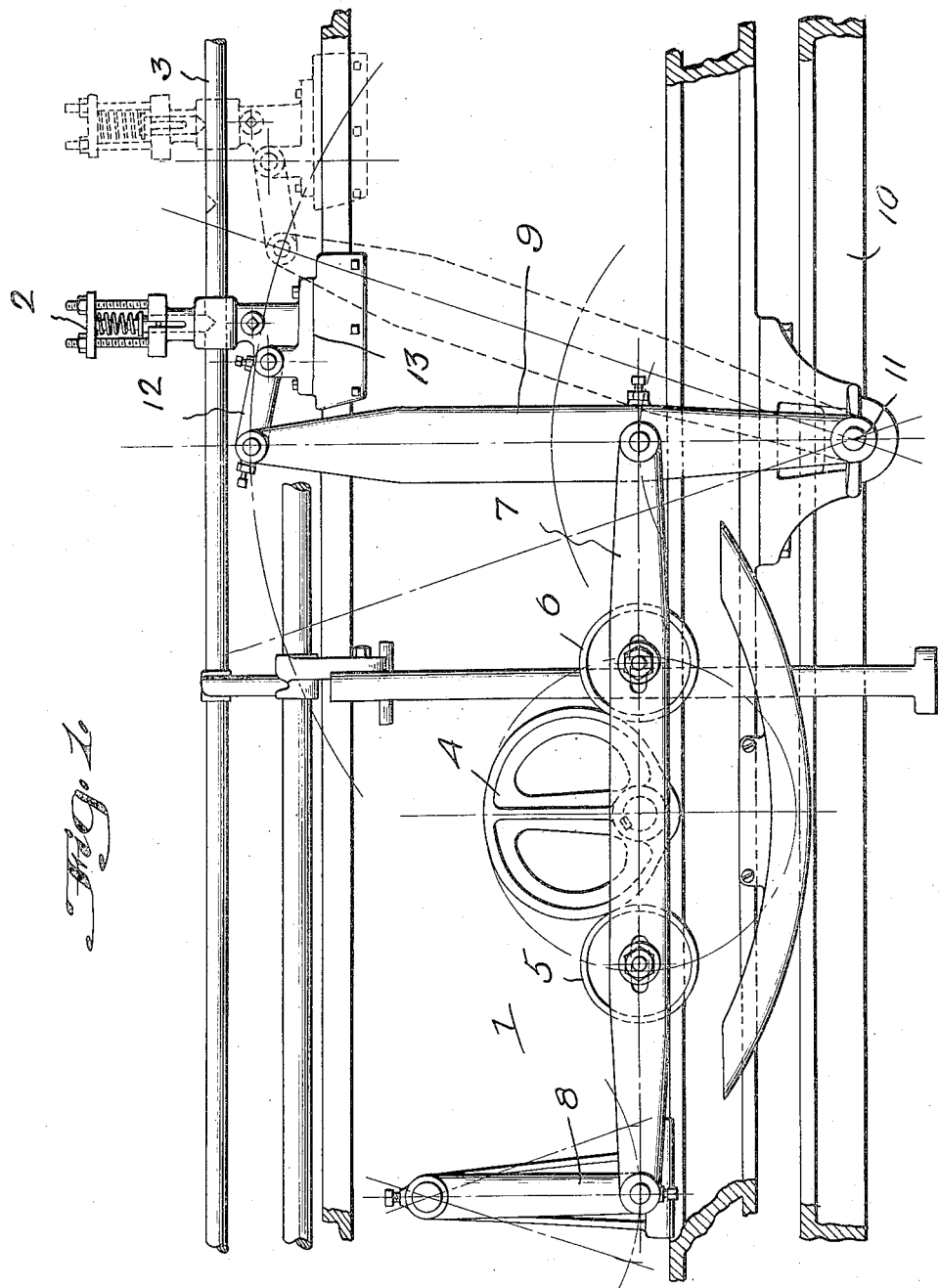
INVENTORS
Kurt O. Waechtler
and
Herbert M. Suess
BY
Wm. R. Smith
ATTORNEY.

Feb. 4, 1936.  K. O. WAECHTLER ET AL  2,030,037
YIELDABLE SAFETY LOCK
Filed Jan. 11, 1934  2 Sheets-Sheet 2
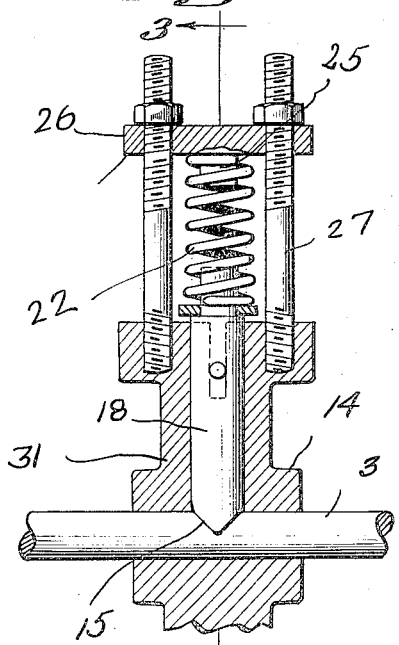
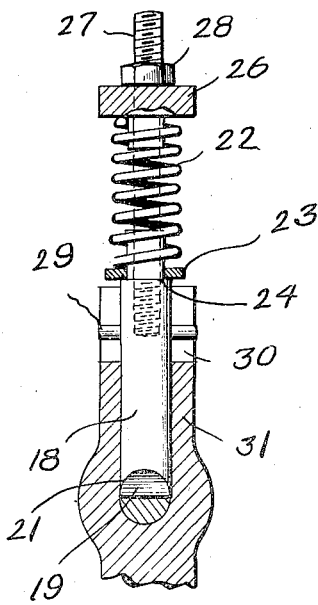
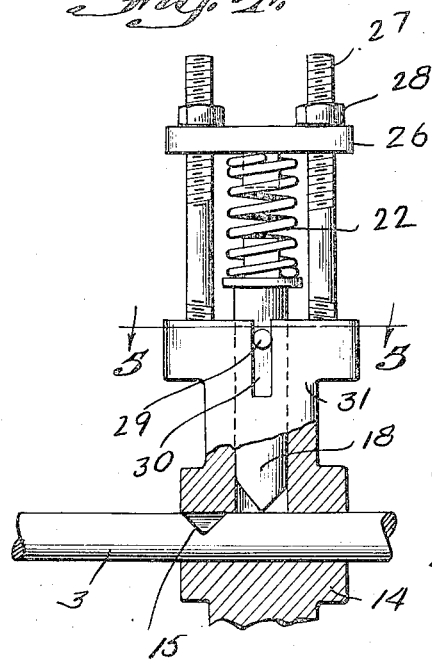
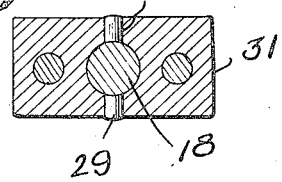
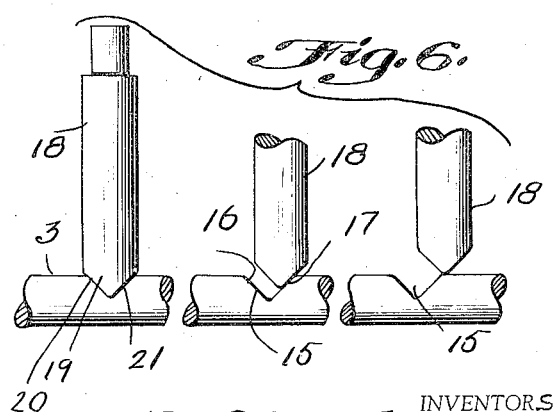
INVENTORS
Kurt O. Waechtler
and
Herbert M. Suess
BY
Wm R. Smith
ATTORNEY.

Patented Feb. 4, 1936

2,030,037

UNITED STATES PATENT OFFICE 2,030,037

YIELDABLE SAFETY LOCK

Kurt O. Waechtler and Herbert M. Suess, Berlin, N. J., assignors to Textile Machine Works, Wyomissing, Pa., a corporation of Pennsylvania Application January 11, 1934, Serial No. 706,166

4 Claims. (Cl. 66—82)

This invention relates to a safety locking device for full fashioned knitting machines and the like, of the type employing friction box connecting means between thread carrier rods and actuating means therefor, and more particularly to a safety device for the coulier motion mechanism and has for its primary object the provision of a locking device that under normal operating conditions will effectively lock the coulier motion mechanism to the friction box rod for the driving thereof but under abnormal operation of the friction box rod the lock device will automatically disconnect the coulier motion mechanism from its driving connection with the friction box rod to stop further movement of the latter.

An object of the invention is to provide a yieldable frictional drive connection between the friction box rod and the coulier motion mechanism so adjusted that the friction box rod may be operated by the coulier motion mechanism when the frictional resistivity of the friction box rod is normal but upon increased resistivity of the friction box rod against movement the coulier motion mechanism will be disconnected from the friction box rod so as to prevent further movement of the latter.

Another object of this invention is to provide a limitedly yieldable connection between reciprocating driving and driven members of a knitting machine.

A feature of the invention resides in the design of the component parts of the safety lock device whereby manual adjustments can be made to regulate the action of the device according to variations in the degree of power required to operate the friction box rod.

Our invention is distinguished in the elimination of a fixed drive connection between the coulier motion mechanism and the friction box rod thereby materially reducing breakage of parts of the textile knitting machine.

With these and other objects in view the invention will be better understood from the following detail description taken in connection with the accompanying drawings, wherein:

Figure 1 is a side elevation of the invention in applied position.

Figure 2 is a vertical sectional view of the device.

Figure 3 is a sectional view on the line 3—3, Figure 2.

Figure 4 is a side elevation partly in section.

Figure 5 is a sectional view on the line 5—5, Figure 4.

Figure 6 is a group view illustrating relative positions of the catch and notch in the friction box rod.

Again referring to the drawings illustrating one of the many constructions of the invention, the numeral 1 designates the usual coulier motion mechanism, the numeral 2 designates the improved safety lock device and the numeral 3 designates the usual friction box rod slightly modified in construction as hereinafter set forth.

The coulier motion mechanism 1 comprises the cam 4 and rollers 5 and 6 coacting therewith and secured to a pitman 7 that in turn has one end connected to a hanger 8 and the other end connected to the operating lever 9. The lower end of lever 9 is pivotally connected to the frame 10 of the textile machine as indicated at 11 and its other end is pivotally connected with link 12 that in turn is pivotally connected to the usual slide bracket 13 provided with the usual bearing 14 which in this particular case is loosely and slidably mounted on the friction box rod 3. Referring to Figures 2 to 6 inclusive, it has been noted that the friction box rod 3 is provided with a V shaped notch 15 the oppositely inclining surfaces 16 and 17 being so disposed as to offer the required pressure to displace the catch 18 of the safety device in the operation of the friction box rod. For this purpose, the nose 19 of the catch 18 is provided with oppositely inclining cam surfaces 20 and 21 adapted to be moved into flat engagement with the cam surfaces 16 and 17 of the rod when the rod is properly connected to the safety device for the normal operation of the rod. In other words, the normal binding engagement between the catch 18 and the rod 3 is great enough to prevent displacement of parts thereby assuring the proper movements of the rod 3 by the coulier motion mechanism under normal conditions but under abnormal operating conditions such as when the friction box rod offers too great a resistance to movement thereof by the coulier motion mechanism the cam action between surfaces 16 and 17 and faces 20 and 21 will be great enough to raise the catch as shown in Figure 6 thereby allowing the bracket to slide independently of the rod as clearly shown by the dotted lines in Figure 1 of the drawings. For the purpose of yieldably controlling the displacement of the catch by the cam actions of the surfaces, a coil spring 22 is provided that has one end engaging part of the catch and resting upon a collar 23 that in turn abuts a shoulder 24 formed on the catch. The opposite end of the spring is coiled around a lug 25 projecting from a plate 26 that is slidably mounted on the threaded pins 27. Mounted on the threaded pins 27 are nuts 28 that bind against the plate for adjusting the position thereof and thereby the tension of the spring 22. For the purpose of preventing the turning of the catch 18 and displacement of the cam faces 20 and 21 in relation to the cam surfaces 16 and 17 there is passed through the catch a key 29 having its ends slidably mounted in slots 30 formed in the head 31 of the bracket 13.

In the operation of the safety device, the tension of the spring is adjusted to the required degree by the adjustment of the nuts 28 so that the resistivity of the catch 18 against displacement is great enough to assure a positive drive connection between the bracket and the rod 3 under normal conditions but upon abnormal action of the rod 3, as by the jamming thereof the cam action of the cam surfaces 16 and 17 and the cam faces 20 and 21 will be great enough to raise the catch 18 as clearly shown in Figure 6 thereby disconnecting the coulier motion mechanism from the rod 3 to prevent damage to parts of the textile machine which would take place if the coulier motion mechanism had the usual rigid connection to the rod 3, however, any resisting force less than this jamming force acting upon said rod, will cause catch 18 to be raised to a position intermediate the bottom and top of notch 15 as illustrated at the center of Fig. 6, but which will not effect complete removal of catch 18 from notch 15, thus permitting a limited relative movement between the rod 3 and the device 2 which action absorbs the shock of said lesser force. Upon the rod 3 being relieved of its abnormal condition, the safety device can be moved into proper relation with the notch 15, the catch automatically moving into engagement with the walls of the notch thereby properly connecting the coulier motion mechanism with the rod for the further operation of the latter. Thus, the safety device can be effectively released from its engagement with the rod without breakage of parts and may be as readily reset for further operation of the rod 3. Attention is called to the fact that the adjustable feature of the safety lock device is important in accurately regulating the conditions under which the safety lock device will function to disconnect the coulier motion mechanism from the friction box rod 3.

Another important feature of the invention is the fact that the safety lock device may be connected to and disconnected from the rod 3 any number of times without the necessity of replacement of a part and further accurate connection between the coulier motion mechanism and the rod is assured by the novel manner of connecting the device to the rod, the catch automatically springing into engagement with the notch of the rod when the latter is aligned with the catch which takes place when the rod 3, bracket 13 and drive parts of the coulier motion mechanism are properly correlated. It is, of course, to be understood that the various parts of the safety lock device may be designed and correlated in various other manners than illustrated and various other types of lock devices may be substituted in the combinations herein set forth and claimed and therefore we do not desire to be limited in protection in any manner whatsoever except as set forth in the following claims.

What we claim is:

1. In combination with the friction box rod and the coulier motion mechanism of a full fashioned knitting machine, said rod subject to a variable force acting to resist its movement during reciprocation thereof, a device therefor having permanent drive connection to said mechanism and frictional releasable drive connection to said rod, whereby complete release of said device from said rod is effected upon the rod encountering a predetermined maximum resistance, and a shock absorbing limited relative movement, insufficient to effect complete release of said device and rod, is effected upon the rod encountering a resistance less than said predetermined maximum resistance.

2. In combination with the coulier motion mechanism and the friction box rod of a full fashioned knitting machine, said rod subject to a variable force acting to resist its movement during reciprocation thereof, a device for connecting said mechanism to said rod and releasable to discontinue the drive of said rod by said mechanism when the resistance of said rod against movement attains a predetermined maximum, and effecting a shock absorbing limited relative movement, insufficient to discontinue the drive of said rod by said mechanism, when a resistance less than said predetermined maximum resistance is encountered by said rod.

3. In combination with the friction box rod and the coulier slide bracket of a full fashioned knitting machine, said rod subject to a variable force acting to resist its movement during reciprocation thereof, a device mounted on said bracket and having a yieldable connection with said friction box rod and means to adjust said yieldable connection, whereby complete release of said device from said rod is effected upon the rod encountering a predetermined maximum resistance, and a shock absorbing limited relative movement, insufficient to effect complete release of said device and rod, is effected upon the rod encountering a resistance less than said predetermined maximum resistance.

4. In a full fashioned knitting machine provided with reciprocating driving and driven members, one of the members being subject to impact forces acting to alter its position relative to the other member during normal reciprocation thereof; one of said members being provided with a cam surface, and means urging said members to normal relative position comprising an element associated with the other of said members and resilient means for maintaining said element in cooperative association with said cam surface and permitting a limited relative movement between the driving and driven members, whereby said impact forces acting to alter the relative position of the driving and driven members are absorbed by the limited relative movement of said members.

KURT O. WAECHTLER.
HERBERT M. SUESS.